United States Patent
Fan et al.

(10) Patent No.: US 11,323,444 B2
(45) Date of Patent: May 3, 2022

(54) METHOD FOR FASTER SECURE MULTIPARTY INNER PRODUCT COMPUTATION WITH SPDZ

(71) Applicant: Robert Bosch GmbH, Stuttgart (DE)

(72) Inventors: Xinxin Fan, San Mateo, CA (US); Qingji Zheng, Pittsburgh, PA (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 327 days.

(21) Appl. No.: 16/618,622

(22) PCT Filed: Sep. 25, 2018

(86) PCT No.: PCT/EP2018/075857
§ 371 (c)(1),
(2) Date: Dec. 2, 2019

(87) PCT Pub. No.: WO2019/063503
PCT Pub. Date: Apr. 4, 2019

(65) Prior Publication Data
US 2020/0186528 A1  Jun. 11, 2020

Related U.S. Application Data

(60) Provisional application No. 62/565,729, filed on Sep. 29, 2017.

(51) Int. Cl.
*H04L 29/06* (2006.01)
*G06F 17/16* (2006.01)

(52) U.S. Cl.
CPC ............. *H04L 63/10* (2013.01); *G06F 17/16* (2013.01)

(58) Field of Classification Search
CPC ....... H04L 63/10; H04L 2209/46; H04L 9/00; G06F 17/16
See application file for complete search history.

(56) References Cited

U.S. PATENT DOCUMENTS 9,077,539 B2 * 7/2015 Kamara ................ H04L 9/3218
9,449,177 B1 * 9/2016 El Defrawy ............ G06F 21/40
(Continued)

FOREIGN PATENT DOCUMENTS

WO    2016/159357 A1    10/2016

OTHER PUBLICATIONS

Roohi et al.; "Privacy-Preserving Queries over Secret-Shared Graph-Structured Data", 2017, IEEE, pp. 955-960. (Year: 2017).*
(Continued)

*Primary Examiner* — Matthew Smithers
(74) *Attorney, Agent, or Firm* — Maginot, Moore & Beck LLP

(57) ABSTRACT

A method for secure multiparty computation of an inner product includes performing multiparty additions to generate a first sum share and a second sum share between two shares of alternating elements from corresponding pairs of elements in a first vector and a second vector, performing multiparty multiplications with at least one other node to generate inner product pair shares corresponding to products of the first sum shares and the second sum shares corresponding to pairs of elements in the first and second vectors, and performing another multiparty addition of each inner product pair share with a first negated shares of pair products corresponding to pairs of elements in the first vector and a second negated shares of pair products corresponding to pairs of elements in the second vector to generate a share of an inner product of the first and second vectors.

15 Claims, 2 Drawing Sheets

(56) References Cited

U.S. PATENT DOCUMENTS

| | | | | |
|---|---|---|---|---|
| 2007/0053507 A1* | 3/2007 | Smaragdis | .............. | H04L 9/008 380/28 |
| 2012/0002811 A1* | 1/2012 | Smart | .................... | H04L 9/085 380/255 |
| 2015/0358155 A1* | 12/2015 | Ikarashi | .................. | H04L 9/085 713/189 |
| 2018/0366036 A1* | 12/2018 | Furukawa | ............. | H04L 9/0869 |
| 2020/0304293 A1* | 9/2020 | Gama | ...................... | G06N 3/08 |

OTHER PUBLICATIONS

Pettai et al.; "Combining Differential Privacy and Secure Multiparty Computation", Dec. 2015, ACM, pp. 421-430. (Year: 2015).*

Zhenlin et al.; "A Predicate Encryption Scheme Supporting Multi-party Cloud Computation", 2015, IEEE, pp. 252-256. (Year: 2015).*

Shaneck et al.; "Efficient Cryptographic Primitives for Private Data Mining", 2010, IEEE, pp. 1-9. (Year: 2010).*

International Search Report corresponding to PCT Application No. PCT/EP2018/075857, dated Nov. 26, 2018 (4 pages).

Catrina, O. et al., "Improved Primitives for Secure Multiparty Integer Computation," SCN 2010, LNCS 6280, pp. 182-199, 2010 (18 pages).

Keller, M. et al., "MASCOT: Faster Malicious Arithmetic Secure Computation with Oblivious Transfer," International Association for Cryptologic Research, vol. 20160914:152228, Sep. 14, 2016, pp. 1-39 (39 pages).

Vaidya, J. et al., "Privacy-preserving Naïve Bayes classification," The VLDB Journal, vol. 17, pp. 879-898, 2008 (20 pages).

Damgå,rd, I. et al., "Multiparty Computation from Somewhat Homomorphic Encryption," CRYPTO 2012, LNCS 7417, pp. 643-662, 2012 (20 pages).

Damgård, I. et al., "Practical Covertly Secure MPC for Dishonest Majority—Or: Breaking the SPDZ Limits," ESORICS 2013, LNCS 8134, pp. 1-18, 2013 (18 pages).

Dong, C. et al., "A Fast Secure Dot Product Protocol with Application to Privacy Preserving Association Rule Mining," Advances in Knowledge Discovery and Data Mining: 18th Pacific-Asia Conference (PAKDD 2014), Springer International Publishing, 2014 (13 pages).

Du, W. et al., "Building Decision Tree Classifier on Private Data," IEEE International Conference on Data Mining, Workshop on Privacy, Security, and Data Mining, Conferences in Research and Practice in Information Technology, vol. 14, Australian Computer Society, Inc., 2002 (8 pages).

Zhu, Y. et al., "Efficient scalar product protocol and its privacy-preserving application," Int. J. Electronic Security and Digital Forensics, vol. 7, No. 1, pp. 1-19, 2015 (19 pages).

* cited by examiner

METHOD FOR FASTER SECURE MULTIPARTY INNER PRODUCT COMPUTATION WITH SPDZ

CLAIM OF PRIORITY

This application is a 35 U.S.C. § 371 National Stage Application of PCT/EP2018/075857, filed on Sep. 25, 2018, which claims the benefit of U.S. Provisional Application No. 62/565,729, filed on Sep. 29, 2017, the disclosures of which are expressly incorporated herein by reference in their entirety.

FIELD

This disclosure relates generally to the fields of information security, and, more particularly, to systems and methods that perform multiparty inner product computations while preserving the privacy of individual inputs to the computations.

BACKGROUND

Secure multiparty computation (MPC) systems enable a group including multiple parties, where each "party" is a computing device, to perform joint calculations that produce results that are shared by all of the party while preserving the privacy of individual data elements that are each known only to a single party. For example, one classic problem that is addressed in an MPC system is to determine which party in a group has the largest value without divulging the largest value or any other value of any party to the other parties in the group. Secure MPC protocols can implement a solution to this problem and to a wide range of mathematical operations.

One type of secure MPC protocol is referred to as the SPDZ protocol, which enables a wide range of mathematical operations to be performed by multiple parties in a group that each store individual sets of data that are not shared with other parties in the group. The SPDZ protocol enables groups of two or more parties to perform addition/subtraction and multiplication operations, in which each party has access to only a portion of the information available and cannot determine the information held by other parties using only the accessible portion of information and the final result of the SPDZ computation, which is made available to all parties in a group.

While the SPDZ protocol can be used to perform a large range of computations that can be decomposed into addition/subtraction and multiplication operations, one common type of operation that includes addition and multiplication is the inner product operation that is applied to two vectors of equal length N, which are referred to as vectors w and x herein ($w=(w_1, w_2, \ldots w_N)$ and $x=(x_1, x_2, \ldots x_N)$. As is well known to the art, the inner product operation (also referred to as a "dot product") multiplies the corresponding pairs of elements from both vectors together to produce individual products and sums all of the products to produce a final scalar sum value. For example, if $w=(1, 2, 3)$ and $x=(4, 5, 6)$, then the inner product is: $(1 \cdot 4)+(2 \cdot 5)+(3 \cdot 6)=32$. The inner product operation is used in a wide range of practical computations, and to cite one non-limiting example, neural networks make heavy use of inner product operations where the vector w represents a vector of weights used in the neural network and the vector x represents input values, where part of the operation of a neuron is to generate a sum of each weights multiplied by a corresponding input value, which is the inner product operation described above. The SPDZ protocol enables two or more parties that each has access to only part of the input data to generate the inner product value using secure multiparty computations. For example, in one configuration one computing device has access to the weight vector w in the neural network and another computing device has access to an input vector x, which may contain information about an input image or other input data that is privacy sensitive. The SPDZ protocol enables the computation of the final output of the inner product without revealing the input vector x to the party that stores the weight values w and without revealing the weight values w to the party that stores the input vector x. The SPDZ protocol enables this operation between groups of at least two parties, although in some configurations the vectors w and x are further subdivided amongst a larger group of parties. While not described in greater detail herein, the SPDZ protocol also provides some ability for parties in a group to determine if a subset of the parties has manipulated shared data to generate an incorrect final result, which provides some capability for the group to determine if the final computed result has been calculated accurately or should be discarded.

The SPDZ protocol uses a two-phase approach that includes an "offline" phase of computations that multiple parties use for the secure exchange of randomly generated numbers known as Beaver triples with each other. The Beaver triples are not the actual data of interest to the nodes, but are used in the subsequent online phase to enable computation of shared results while preventing each party from identifying the private data from one or more additional parties. The offline phase introduces computations to compute and share the Beaver triples that includes encryption operations, and is generally considered to be the more computationally intensive phase of the SPDZ protocol. In a second "online" phase the parties use the Beaver triples and the actual data of interest to perform secure multiparty computations, including the inner product computation that is described above. While the SPDZ protocol is effective at performing inner product computations, the large number of multiplication operations that occur in the inner product computation during the online phase introduces additional communication operations that each requires the use of Beaver triples and produces computational overhead between the parties due to the underlying operations that SPDZ implements for multiparty multiplications. Consequently, improvements to systems and methods for multiparty computation that reduce the computational and communication requirements to improve the performance of secure multiparty computation of inner products would be beneficial.

SUMMARY

In one embodiment, a method for secure multiparty computation of an inner product has been developed. The method includes performing, with a processor in a first node, a plurality of multiparty additions, each multiparty addition generating one of a first sum share and a second sum share between alternating shares of elements from corresponding pairs of elements in a first vector and a second vector, performing, with the processor and a network interface device in the first node, a plurality of multiparty multiplications with at least one other node, each multiparty multiplication generating an inner product pair share corresponding to a product of the first sum share and the second sum share corresponding to each pair of elements in the first vector and the second vector, and performing, with the processor in the first node, another multiparty addition of each inner product pair share from the plurality of multiparty multiplications with a first plurality of negated shares of pair products corresponding to pairs of elements in the first vector and a second plurality of negated shares of pair products corresponding to pairs of elements in the second vector to generate a share of an inner product of the first vector and the second vector.

In a further embodiment, the first vector and the second vector each have a first number of elements and a number of the multiparty multiplications performed by the processor and the network interface in the first node is one half of the first number.

In a further embodiment, the method includes generating, with the processor and the network interface device in the first node, a plurality of Beaver triples prior to performing the plurality of multiparty multiplications, each Beaver triple including shares of three values that are reshared between the first node and the at least one other node, each multiparty multiplication in the plurality of multiparty multiplications consuming the shares of the three values of one Beaver triple in the plurality of Beaver triples.

In a further embodiment, the method includes generating, with a processor in the first node, a first plurality of pair products by multiplication of pairs of elements in the first vector stored in a memory in the first node, encrypting, with the processor in the first node, each pair product in the first plurality of pair products using a public key to generate a first plurality of encrypted pair products, generating, with the processor in the first node, a first plurality of encrypted signatures for the first plurality of encrypted pair products using an encrypted message authentication code (MAC) key, and performing, with the processor and the network interface device in the first node, a plurality of resharing operations to distribute shares of each encrypted signature between the first node and the at least one other node.

In a further embodiment, the at least one other node includes a plurality of other nodes.

In another embodiment, a method for secure multiparty computation of an inner product has been developed. The method includes performing, with a processor and a network interface device in a first node, a first plurality of share distribution operations to distribute a first plurality of shares corresponding to a plurality of elements in a first vector stored in a memory of the first node between the first node and at least one other node, generating, with a processor in the first node, at least one pair product based on a multiplication of at least one pair of elements in the first plurality of elements in the first vector, performing, with the processor and the network interface device in the first node, at least one share distribution operation to distribute shares of the at least one first pair product between the first node and the at least one other node, receiving, with the processor and the network interface device in the first node, a second plurality of shares from the at least one other node, the second plurality of shares corresponding to a plurality of elements in a second vector, receiving, with the processor and the network interface device in the first node, at least one second pair product share from the at least one other node, the at least one second pair product share corresponding to at least one pair product of two elements in the second vector, performing, with the processor in the first node, a plurality of multiparty additions, each multiparty addition generating one of a first sum share and a second sum share between alternating shares of elements from corresponding pairs of elements in a first vector and a second vector, performing, with the processor and the network interface device in the first node, at least one multiparty multiplication with the at least one other node, each multiparty multiplication generating an inner product pair share corresponding to a product of the first sum share and the second sum share corresponding to each pair of elements in the first vector and the second vector, and performing, with the processor in the first node, another multiparty addition of each inner product pair share from the at least one multiparty multiplication with a negation of the at least one first pair product share and a negation of the at least one second pair product share to generate a share of an inner product of the first vector and the second vector.

In a further embodiment, the first vector and the second vector each have a first number of elements and a number of the multiparty multiplications performed by the processor and the network interface in the first node is one half of the first number.

In a further embodiment, the method includes generating, with the processor and the network interface device in the first node, at least one Beaver triple prior to performing the at least one multiparty multiplication, the at least one Beaver triple including shares of three values that are reshared between the first node and the at least one other node, each multiparty multiplication in the at least one multiparty multiplication consuming the shares of the three values of one Beaver triple.

In a further embodiment, the method includes generating, with a processor in the first node, a first plurality of pair products by multiplication of pairs of elements in the first vector stored in a memory in the first node, encrypting, with the processor in the first node, each pair product in the first plurality of pair products using a public key to generate a first plurality of encrypted pair products, generating, with the processor in the first node, a first plurality of encrypted signatures for the first plurality of encrypted pair products using an encrypted message authentication code (MAC) key, and performing, with the processor and the network interface device in the first node, a plurality of resharing operations to distribute shares of each encrypted signature between the first node and the at least one other node.

In a further embodiment, the at least one other node includes a plurality of other nodes.

In another embodiment, a node configured to perform secure multiparty computation of an inner product has been developed. The node includes a network interface device configured to communicate with at least one other node, a memory, and a processor operatively connected to the network interface device and the memory. The memory is configured to store a first plurality of shares corresponding to a plurality of elements in a first vector, a second plurality of shares corresponding to a plurality of elements in a second vector, a first plurality of negated shares of pair products corresponding to pairs of elements in the first vector, and a second plurality of negated shares of pair products corresponding to pairs of elements in the second vector. The processor is configured to perform a plurality of multiparty additions, each multiparty addition generating one of a first sum share and a second sum share between two alternating shares of elements from the first vector and the second vector, the two alternating shares including one share in the first plurality of shares and another share in the second plurality of shares, perform a plurality of multiparty multiplications with at least one other node using the network interface device, each multiparty multiplication generating an inner product pair share corresponding to a product of the first sum share and the second sum share corresponding to each pair of elements in the first vector and the second vector, and perform another multiparty addition of each inner product pair share from the plurality of multiparty multiplications with the first plurality of negated shares of pair products stored in the memory and the second plurality of negated shares of pair products stored in the memory to generate a share of an inner product of the first vector and the second vector.

In a further embodiment, the first vector and the second vector each have a first number of elements and a number of the multiparty multiplications performed by the processor and the network interface in the node is one half of the first number.

In a further embodiment, the processor is further configured to generate a plurality of Beaver triples prior to performing the plurality of multiparty multiplications, each Beaver triple including shares of three values that are reshared between the node and the at least one other node using the network interface device, each multiparty multiplication in the plurality of multiparty multiplications consuming the shares of the three values of one Beaver triple in the plurality of Beaver triples.

In a further embodiment, the processor is further configured to generate a first plurality of pair products by multiplication of pairs of elements in the first vector, the first vector being stored in the memory, encrypt each pair product in the first plurality of pair products using a public key to generate a first plurality of encrypted pair products, generate a first plurality of encrypted signatures for the first plurality of encrypted pair products using an encrypted message authentication code (MAC) key, and perform a plurality of resharing operations to distribute shares of each encrypted signature between the first node and the at least one other node using the network interface device.

In a further embodiment, the at least one other node includes a plurality of other nodes.

DETAILED DESCRIPTION

Figure 1:
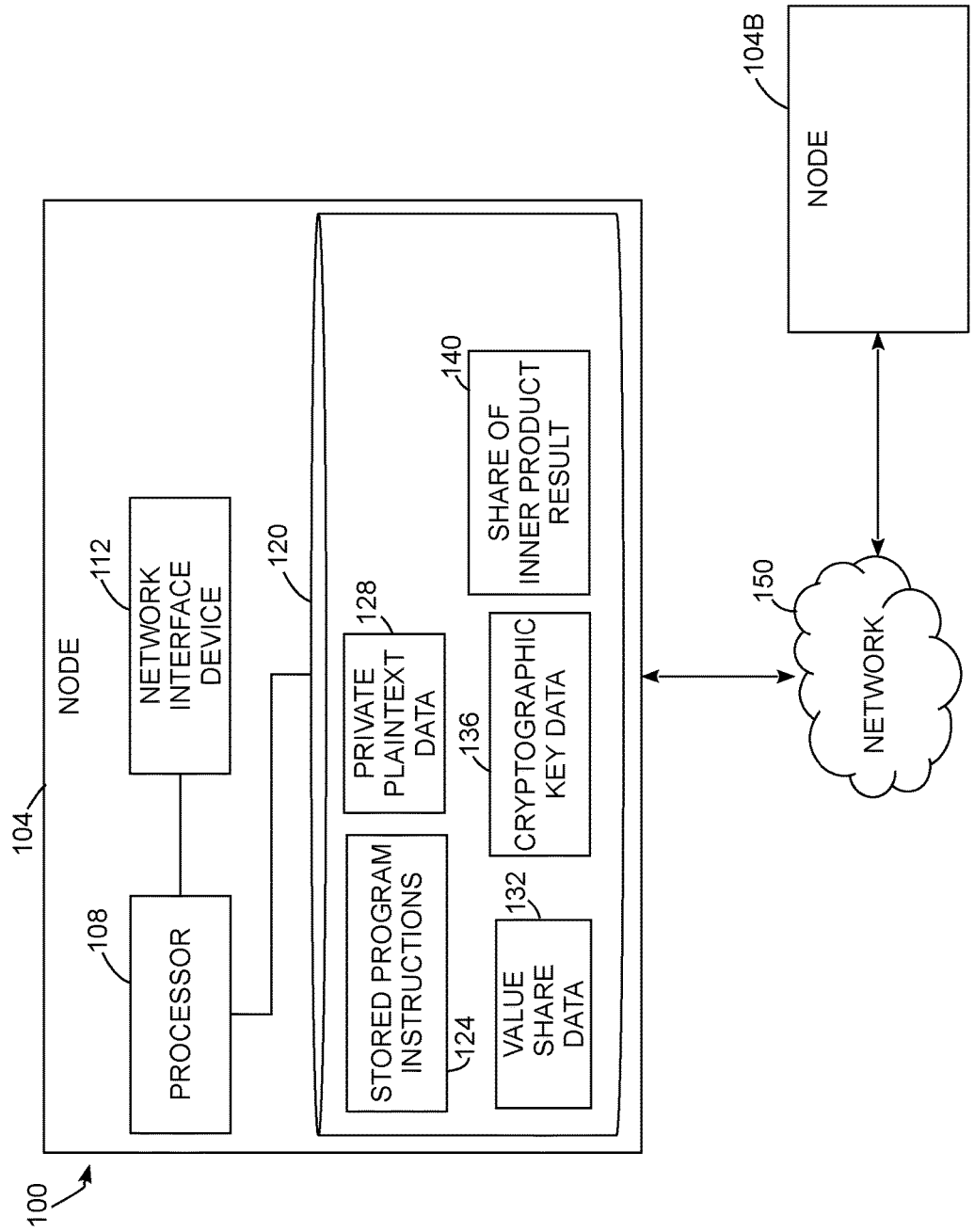
FIG. 1 is a schematic diagram of a system that is configured to perform secure multiparty computation of inner products with improved efficiency.

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "Beaver triple" refers to a set of three values (a, b, c) in which a and b are selected uniformly at random and c is equal to the product of a multiplied by b: c=ab. All three numbers in the Beaver triple are members of a finite field $F_p$ where p is a modulo value. In some illustrative embodiments where $p=2^n-1$, the finite field $F_p$ includes all integers in a range of $[-2^{n/2}, 2^{n/2}-1]$ where n is 64, 80, or 128, although other finite fields can be used. As described in further detail below, in a modified SPDZ protocol the parties generate Beaver triples during an offline computation phase and distribute shares of the Beaver triples in a secure manner for later use as part of an online computation phase for multi-party computation of inner products.

As used herein, the terms "homomorphism" and "homomorphic" refer to a property of some cryptographic systems in which mathematical operations can be applied to encrypted values to produce an encrypted result that matches the result of performing the same operations to the plaintext values without revealing the contents of the encrypted values or the result to the computing device that performs the operation. For example, given two values a=1 and b=2 and their corresponding encrypted counterparts a' and b', in a cryptographic system that provides additive homomorphism the encrypted value c'=a'+b' stores an encrypted representation of the number "3" (1+2=3). The value c' can be computed by a computer that cannot determine the plaintext values of a' or b' and, in some instances, the computer that produces c' can decrypt c' to retrieve the plaintext sum (3) without the ability to determine the original plaintext values of a or b. Subtractive homomorphism similarly applies to an operation that subtracts two encrypted values (e.g. a=2, b=1, c'=a'-b', decryption (c')=1), and in the embodiments described herein subtractive homomorphism is also equivalent to additive homomorphism in which one or more selected values are negated to perform an addition operation that is equivalent to subtraction. Similarly, a cryptographic system that provides multiplicative homomorphism the product of two encrypted values (a' and b') is another encrypted value (c') that decrypts to the same value as the product of the two plaintext values (a and b) (e.g. a=2, b=3, c'=(a'b'), decryption (c')=6). In the embodiments described herein, the ⊞ notation refers to an addition between two encrypted values in a cryptographic system that provides additive homomorphism, the ⊟ refers to a subtraction operation between two encrypted values in a cryptographic system that provides subtractive homomorphism, where subtraction can be considered as addition of a negated value, and the ⊠ notation similarly refers to a multiplication between two encrypted values in a cryptographic system that provides multiplicative homomorphism.

As used herein, the term λ refers to a message authentication code (MAC) cryptographic key that is selected from the finite field $F_p$ ($\lambda \in F_p$). Each of the parties $P_i$, $1 \leq i \leq n$, that perform the inner product operation are provided with an individual share $\lambda_i$ of the overall secret λ where λ is the sum of all the individual secrets ($\lambda = \lambda_1 + \ldots + \lambda_n$). None of the parties has access to the full MAC cryptographic key λ. The MAC cryptographic key λ can generate an encrypted MAC value that corresponds to a message authentication code for a value x via multiplication λx, and as described below the MAC key λ can itself be encrypted using a public key to generate an encrypted ciphertext of the MAC key $ct_\lambda$ that can be shared amongst multiple parties. The encrypted MAC value is used for verification of information received from other parties and to provide resistance against malicious parties that alter shared data during multiparty computation operations. Some embodiments that are described herein may omit the use of the MAC key λ in configurations of multiparty computation systems that preserve privacy of the origin input data but that trust the participants to provide accurate data outputs during multiparty computations.

As used herein, the term ε=(Enc, Dec) refers to an asymmetric public key encryption system that provides at least additive/subtractive and multiplicative homomorphism with threshold decryption. The term sk refers to the private key in ε that is used for decryption of ciphertext with the Dec function and the term pk refers to the public key in E that is used for the encryption of plaintext to produce ciphertext using the Enc function. Each of the parties $P_i, 1 \leq i \leq n$ that performs the multiparty inner product computation has access to the full public key pk and a portion of the private key $sk_i$ where $sk=sk_1+\ldots+sk_n$ where none of the parties has access to the full private key sk.

As used herein, the notation [ ] for a value (e.g. [x]) indicates a "share" of the value or where multiple parties each hold a share [x] of the overall value x, but having access to a share [x] does not reveal the actual value of x. In the embodiments described below, the value x is an encrypted ciphertext value, and the additive homomorphic properties of the cryptographic systems used herein enable the total value x to be divided into individual shares that have a total value of x. In the computation of inner products from two vectors that have multiple elements, each element of a vector represents a value that is shared amongst two or more nodes in a secure manner. Mathematically, $[x]=\{(x_1, \gamma_1(x)), \ldots, (x_n, \gamma_n(x))\}$ for a total of n parties $P_i$, $1 \leq i \leq n$ where each share $[x_i]$ is a portion of the total [x] where $x=x_1+x_2\ldots+x_n$, the term $\gamma_i(x)$ for each party is another individual share of the value $H_x$, which is the output of the cryptographic key $\lambda$ multiplied by the value x ($H_x=\lambda_x$), and given the individual shares $\gamma_1(x)$, the total is $H_x=\gamma_1(x)+\gamma_2(x)+\ldots+\gamma_n(x)$. Each party stores a share value [x] as one of the tuples $(x_i, \gamma_i(x))$, and does not reveal this tuple to other parties in the group directly.

Resharing, Share Distribution, Multiparty Addition, and Multiparty Multiplication in SPDZ As described in further detail below, the nodes that participate in modified version of the SPDZ MPC protocol perform an offline and online operation phase. Three operations that occur during this phase are a secure resharing operation, a multiparty addition/subtraction operation, and a multiparty multiplication. These individual operations are part of the existing SPDZ protocol and are described herein based on the SPDZ protocol. A secure resharing operation, which is referred to as a "reshare" or "resharing" operation, enables two or more nodes to generate shares of a value that is already known to all of the nodes (i.e. the full value is already "shared" by the nodes and this process "reshares" portions of the overall value) in which each node holds a share of the total value without knowing the share that is held by any other node. In the embodiments described herein, the reshare operation is defined as: Reshare ($ct_s$, $P_1, \ldots, P_n$) where $ct_s$ is an encrypted ciphertext (ct) of a secret value s and $P_1 \ldots P_n$ represent the n parties that participate in the resharing operation. The encrypted ciphertext value ct is known to all of the parties as a whole, and the resharing operation enables the parties to each receive a share of the original set of data without knowing the shares of the other nodes, even in a two-node system. The resharing operation begins with encryption of the secret value s using the public key pk to produce a ciphertext $ct_s=Enc_{pk}(s)$, and the ciphertext $ct_s$ is transmitted to all of the n parties in the group of parties that receive an encrypted share of the secret value s. Each party i in the n parties generates a uniformly random value $f_i \in F_p$ and uses the public key pk to encrypt the random value to generate a ciphertext of the random value: $ct_{f_i}=Enc_{pk}(f_i)$. Each party transmits the respective ciphertext value $ct_{f_i}$ to all of the other parties via a data network, and each party calculates a ciphertext sum $ct_{s+f}$ of the encrypted value of s and the individual encrypted values $ct_{f_i}$: $ct_{s+f}=c_s \boxplus ct_{f_1} \boxplus ct_{f_2} \boxplus \ldots \boxplus ct_{f_n}$ where once again the $\boxplus$ operator indicates addition of ciphertexts in a cryptographic system that provides additive homomorphism. The parties then perform a cooperative decryption process using the individual portions of the private key $sk_i$ to decrypt the value $ct_{f_i}$ to obtain the sum of s+f, where f is the sum of all the individual random values $f_i$. The final shares amongst the n parties are $[s_1]=s+f-f_1$ for party 1 and $[s_i]=-f_i$ for each of the other i parties.

The resharing operation described above is one method to distribute shares of a ciphertext value that is known to all of the parties in a group. Another operation is referred to as a "share distribution" operation that generate shares of a plaintext value that is known to one party in the group and that does not need to be encrypted before being shared between the nodes in the group while not disclosing the plaintext data to the other parties. As described below, this operation enables nodes in a system that perform multiparty inner product computations to distribute shares of individual elements in a vector and pair products based on the multiplication of two elements in a single vector where one node has access to the plaintext contents of the elements. Given a plaintext value that is referred to as x, the party that possesses the value x generates a random value using a uniform random distribution in $F_p$ for each of the other parties in the group, subtracts all of the randomly generated values from the original value x to generate a share [x] that is used by the original party, and transmits the randomly generated values to one or more additional parties where the random values serve as the shares for [x] used by the other parties. For example, in a group with two parties a first party that holds $x_i$ in memory, where i indicates the index of the value in a vector, and generates a random value that is labeled $x_{i2}$ where the 2 is an index label that indicates another node that receives the random value. The first party generates a share of $x_i$ that is labeled $[x_{i1}]=x_i-x_{i2}$ based on the difference between $x_i$ and $x_{i2}$. The first party transmits the value $x_{i2}$ to the second party and this value is the share of $x_i$ that is received and held by the second party ($[x_{i2}]$). Since the value $x_{i2}$ is merely a random value that is unrelated to the original value $x_i$, this random value may be transmitted through a data network and be observed by all parties in the group and adversaries without compromising the privacy of $x_i$. The share distribution operation can be extended to three or more parties by the generation of additional random values, one for each additional party, and the subtraction of all the random values from the original value by the first party to produce a share for each party. As described above, the value x need not be encrypted to perform the share distribution operation since each of the other parties only receives a random value, although the share distribution operation can also be applied to an encrypted value if x is encrypted. Both of the resharing and the share distribution operations produce shares of a value that are held by multiple parties. The resharing operation additionally prevents a single party from having information about the shares held by other parties, while the share distribution operation enables the first party that holds the original plaintext value to have information about all of the shares, but the other parties do not to observe the share of the first party.

A multiparty addition enables multiple parties to add different shares of l different values to generate a sum, and the multiparty addition also includes subtraction by negating the appropriate values to perform subtraction. In a simple example where l=2 the multiparty addition adds the shares of two numbers together, although a multiparty addition can add the shares of more than two numbers as well. The terms $[x^1], [x^2], \ldots, [x^l]$ represent shares of l different values $x^1, x^2, \ldots, x^l$, respectively, that are being added in the multiparty addition process. In the context of this document the superscript notation does not indicate a mathematical exponent. As described above, each share includes a tuple $(x_i, \gamma_i(x))$. During multiparty addition, each party computes a value $z_i$ based on a sum of the $x_i$ terms from all of the shares: $z_i = x_i^1 + x_i^2 + \ldots + x_i^l$ and a value $\gamma_i(z)$ based on a sum of the $\gamma_i(x)$ terms from all of the shares: $\gamma_i(z) = \gamma_i(x^1) + \gamma_i(x^2) + \ldots + \gamma_i(x^l)$. These operations enable each of the parties $P_i$, $1 \le i \le n$ to have a share $[z_i]$ of the total sum value z and the share $\gamma_i(z)$ of the MAC value $ct_\lambda z$ where each party holds the tuple $(z_i, \gamma_i(z))$. As noted above, each party has a share $[z_i]$ of the sum z, but each party does not have access to the actual sum value of z, which ensures that even in a two-party addition process that one party cannot determine the value held by the other party given the sum and the plaintext of one of the two values being added together.

In the multiparty addition described above, the computational complexity for each addition is o(l) for the l shares that are being added together, and the computations include comparatively simple addition operations without requiring the use of the public key pk for further encryption operations. Furthermore, after the shares $[x^1], [x^2], \ldots, [x^l]$ have been distributed to the parties, there is no further need for communication between parties or the use of a Beaver triple to compute the share of the sum $[z_i]$ for each party.

A multiparty multiplication enables the parties that have shares [x] and [y] of two values x and y. Unlike the multiparty addition that can add together shares from more than two values, the multiparty multiplication is applied to exactly two values. The multiparty multiplication process uses a Beaver triple ([a], [b], [c]) that has been shared in an offline phase that is described below. During the multiparty multiplication process, each party $P_i$, $1 \le i \le n$ uses the addition process that is described above to add shares of the input [x] and a negated Beaver triple share value [a]: $\text{Add}([x_i], -[a_i])$. Similarly, each party uses the addition process that is described above to add shares of the input [y] and a negated Beaver triple share value [b]: $\text{Add}([y_i], -[b_i])$. Each party broadcasts the results of both additions described above to all of the other parties: $\epsilon = x - a$ and $\rho = y - b$. As described above, because of additive homomorphism, the results $\epsilon$ and $\rho$ reveal the total differences between the tuples of x and a and the tuples of y and b. The multiparty multiplication process continues using the $c_i$ value from each share [c] in the Beaver triple as each party generates two local values $z_i$ and $\gamma_i(z)$:

$$z_i = \begin{cases} c_i + \epsilon b_i + \rho a_i + \epsilon \rho & (i = 1) \\ c_i + \epsilon b_i + \rho a_i & (i \ne 1) \end{cases} \text{ and}$$

$$\gamma_i(z) = \gamma_i(c) + \epsilon \gamma_i(b) + \rho \gamma_i(a) + \lambda_i \epsilon \rho$$

The multiparty multiplication process enables each party to hold a share $[z_i]$ of the product of the original values x and y (z=xy) where once again $[z_i]=(z_i,\gamma_i(z))$. As with the multiparty addition process, even if there are only two parties that participate in a multiparty multiplication and each party is assumed to have access to one of the plaintext inputs x or y, the share $[z_i]$ from the multiplication process prevents either party from identifying the value that is held by the other party because the share $[z_i]$ does not reveal the true product value z. The multiparty multiplication process requires both communication between the parties to produce shared values $\epsilon$ and $\rho$. Additionally, the multiplication process consumes the shares ([a], [c]) of one Beaver triple, where each Beaver triple is only used once.

System for Multiparty Computation of an Inner Product with Improved Efficiency

FIG. 1 depicts a system 100 that includes a plurality of compute nodes 104A and 104B that are communicatively connected to each other via a data network 150. In the system 100, each of the nodes 104A and 104B is a party in the MPC processes described herein. Each node is a computing device that acts as a single party in the secure multiparty computations processes that are described herein, and the term "node" is used interchangeably with the term "party" in the embodiments described below. FIG. 1 depicts the node 104A in detail, and the node 104B is configured in a similar manner with different sets of stored data to implement a secure multiparty inner product computation using the embodiments described herein. While FIG. 1 depicts a system with two nodes 104A-104B for illustrative purposes, the embodiments described herein can be performed by groups of three or more nodes as well.

Referring to node 104A in more detail, the node includes a processor 108 that is operatively connected to a network interface device 112 and a memory 120. The processor 108 is typically a central processing unit (CPU) with one or more processing cores that execute stored program instructions 124 in the memory 120 to implement the embodiments described herein. However, other embodiments of the processor 108 use different processing elements instead of, or in addition to, a CPU including graphics processing units (GPUs), field programmable gate arrays (FPGAs), application specific integrated circuits (ASICs), digital signal processors (DSPs), and any other digital logic device that is configured to perform the operations described herein. In some embodiments, the processor 108 implements a hardware random number generator (RNG) or uses a software random number generator or pseudo-random number generator (PRNG) to generate the random values. In the description herein, any reference to the generation of a random value or use of a random value refers to the operation of an RNG or PRNG to generate a value in a uniformly random manner selected from a predetermined numeric range (e.g. the finite field $F_p$).

The network interface device 112 connects the node 104A to a data network 150, such as a local area network (LAN) or wide area network (WAN) to enable communication between the node 104A and the node 104B of FIG. 1, and to additional nodes that perform the secure multiparty inner product computation processes described herein. Non-limiting embodiments of the network interface device 112 include a wired network devices such as an Ethernet adapter or wireless network devices such as a wireless LAN or wireless WAN network adapter. In the system 100, all transmissions of data that are made through the network 150 are assumed to be observed by third party adversaries (not shown in FIG. 1) that can record all data transmitted from the nodes 104A and 104B, although the nodes 104A and 104B may communicate using a transport layer security (TLS) encrypted and authenticated channel or other equivalent communication channel that prevents eavesdroppers from observing or altering communications via the network 150. The embodiments described herein prevent an adversary that can observe communication between the nodes 104A and 104B from determining the value of any private data in addition to preventing the node 104B from identifying the private plaintext data 128 of the node 104A and vice versa during multiparty inner product computations.

The memory 120 includes one or more volatile memory devices such as random access memory (RAM) and non-volatile memory devices such as magnetic disk or solid state memory devices that store the program instructions 124, private plaintext data 128, value share data 132, cryptographic key data 163, and the computed result of the inner produce 140. The private plaintext data 128 include all or a portion of one vector in two vectors that form the inputs to the inner product computation. The two vectors in the plaintext data 128 are referred to as x and w herein. The value share data 132 include the share that each node receives during the operation of the system 100 including shares of Beaver triple values that are generated during an offline phase and shares of values that are exchanged during the inner product calculation process. As described above, each share provides an encrypted version of a portion of each value to each node. The cryptographic key data 136 include a share of the encrypted MAC cryptographic key for the node 104A, the public key pk, and the share of the private key $sk_i$ that is shared with the node 104A. The computed result of the inner product 140 is the final output of the multiparty computation of the inner product value.

The node 104B includes a memory with similar data structures except that the node 104B stores a different set of private plaintext data 128 corresponding to the second vector used to generate the inner product, different sets of secret value shares 132, and different shares of the private key and MAC key in the cryptographic key data 136. As described below, both nodes 104A and 104B compute the same result of the inner product 140. In the illustrative embodiment of FIG. 1, the node 104A stores all of the plaintext elements of the vector x and the node 104B stores all of the plaintext elements of the vector w, but in other embodiments the plaintext data for either or both of the vectors is distributed to multiple nodes to enable a larger number of nodes to perform secure multiparty inner product calculations.

Process for Multiparty Computation of an Inner Product with Improved Efficiency

Figure 2:
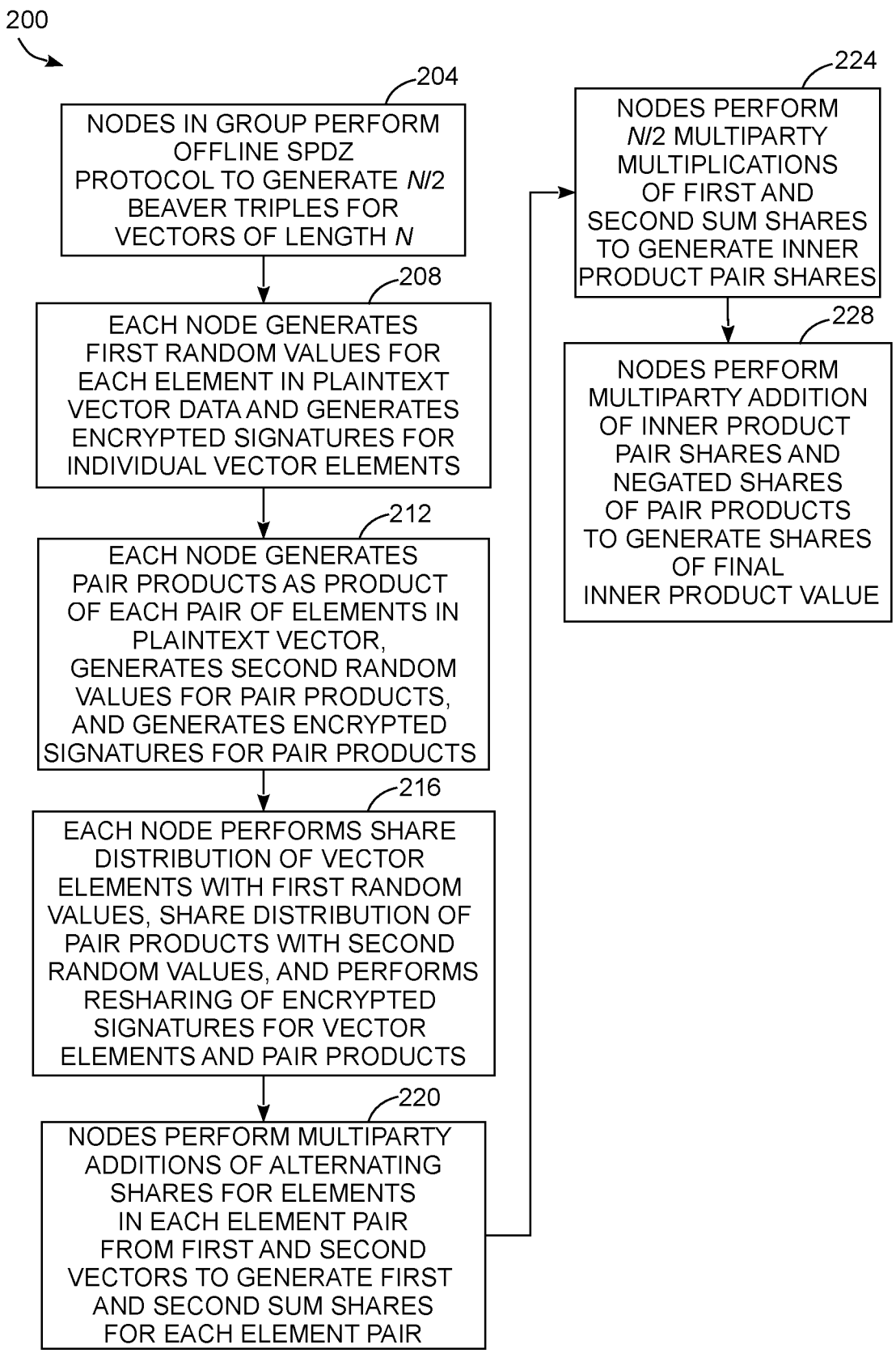
FIG. 2 is a block diagram of a process for secure multiparty inner product computation with improved efficiency.

In a traditional SPDZ system, the inner product computation of two vectors with N elements requires N multiparty multiplications in conjunction with multiparty additions. As described above, each multiplication consumes a Beaver triple. FIG. 2 depicts a process 200 that enables secure multiparty inner product computation between a group of at least two parties, which are the nodes in the system 100, that reduces the number of required multiplications by one-half (N/2 multiplications), which increases the efficiency of computing the inner product. In the example described below, the node 104A stores the first vector with elements x in the private plaintext data 128 of the memory 120 while the node 104B similarly stores the second vector with elements w as plaintext data 128 in the memory 120 of the node 104B. In the discussion below, a reference to the process 200 performing a function or action refers to the operation of a processor in one or more nodes to perform the function or action. The process 200 is described in conjunction with the system 100 of FIG. 1 for illustrative purposes.

The process 200 uses some elements that are known to the art in the SPDZ protocol including an offline phase and an online phase, but the process 200 includes modifications to the SPDZ protocol that reduce the required number of Beaver triples that need to be computed during the offline phase because the process 200 can compute the inner product using fewer multiparty multiplications in the online phase by pairing two elements from the vectors w and x together. Mathematically, this is first expressed as: $(w_1+x_2)(w_2+x_1)-x_1x_2-w_1w_2$ where $(w_1+x_2)(w_2+x_1)=w_1w_2+w_1x_1+x_2w_2+x_2x_1$ using the well-known first-outer-inner-last (FOIL) operation, and the $x_1x_2-w_1w_2$ are subtracted from the total because an inner product operation does not multiply elements from a single vector together, but instead only multiplies elements between two different vectors. This leaves: $w_1x_1+x_2w_2$, which represents two elements in each vector of the inner product that are produced from a single multiplication operation which normally requires two multiparty multiplications in a standard inner-product computation. As described herein the nodes 104A and 104B establish the following shares: $[w_1]$, $[w_2]$, $[x_1]$, $[x_2]$, $[x_1x_2]$, and $[w_1, w_2]$. These shares enable the two nodes 104A and 104B to compute the products of two elements in the vectors using only a single multiparty multiplication between $([w_1]+[x_2])([w_2]+[x_1])$, where the nodes perform the multiparty addition processes to calculate sums of the shares for $w_1+x_2$ and $w_2+x_1$ in a secure manner so that the end result is merely a multiparty multiplication of two share values instead of the multi-term expansion described above. The nodes also subtract the equivalents of the $[x_1x_2]$, and $[w_1, w_2]$ shares that correspond to each multiparty multiplication to produce a correct inner product result. As described below, larger vectors are divided into pairs of elements to compute the inner products using N/2 multiplication for a vector of length N, while the traditional SPDZ process requires N multiplications. Since each multiparty multiplication consumes one of the Beaver triples from the offline phase, reducing the number of multiplications in an inner product computation also reduces the computational and communications requirements for the process 200 compared to a standard SPDZ process that performs inner product computations.

The process 200 begins as the nodes 104A and 104B perform an offline phase to exchange shares of N/2 Beaver triples ([a], [b], [c]) for the multiparty inner product computation where each of the two input vectors x and w has N elements (block 204). The Beaver triple generation process enables each node to have a share of the values (a, b, c) in the Beaver triple without any node have access to the actual value of a, b, or c. In one embodiment, the processor 108 in each of the nodes 104A and 104B generates initial values $a_i$ and $b_i$ with a uniformly random distribution from the finite field $F_p$. The processor 108 in each node then encrypts the initial values and transmits the encrypted values to the other node to publish the ciphertext values between both nodes 104a and 104B: $ct_{ai}=Enc_{pk}(a_i)$; $ct_{bi}=Enc_{pk}(b_i)$. The processor 108 in each node generates an encrypted sum of the a and b values using homomorphic addition of the encrypted values: $ct_a = ct_{ai} \boxplus \ldots \boxplus ct_{an}$ and $ct_b = ct_{bi} \boxplus \ldots \boxplus ct_{bn}$, where in the example of FIG. 1 the two nodes 104A and 104B generate a total of two ciphertext values for each of the a and b values ($ct_{a104A}$, $ct_{a104B}$) and ($ct_{b104A}$, $ct_{b104B}$). One of the parties also computes a ciphertext for the MAC cryptographic key λ: $ct_{\lambda,a}=ct_\lambda \boxtimes ct_a$ and $ct_{\lambda,b}=ct_\lambda \boxtimes ct_b$. To complete secure sharing for shares [a] and [b] that do not reveal the actual values of a and b to either party, the two nodes 104A and 104B execute the reshare operation for both of the values $ct_{\lambda,a}$ and $ct_{\lambda,b}$: Reshare ($ct_{\lambda,a}$, $P_1$, $P_2$) and Reshare ($ct_{\lambda,b}$, $P_1$, $P_2$) where $P_1$ corresponds to node 104A and $P_2$ corresponds to node 104B for illustrative purposes.

To generate the shares of the c value in the Beaver triple where c=ab without revealing the actual value of a, b, or c, to any party, the processor 108 in each of the nodes 104A and 104B first use the additive and multiplicative homomorphic properties of the published ciphertexts ($ct_{a1}, ct_{a2}$)

and $(ct_{b1}, ct_{b2})$ to generate a ciphertext of c: $ct_c = ct_a \boxtimes ct_b = (ct_{a1} \boxplus ct_{a2}) \boxtimes (ct_{b1} \boxplus ct_{b2})$. The nodes then reshare the ciphertext $ct_c$: Reshare ($ct_c$, $P_1$, $P_2$). The value of $ct_c$ can be used to produce a share [c] that does not reveal c to either of nodes 104A or 104B, but in some embodiments the nodes 104A and 104B perform additional operations to provide additional tamper resistance if a party manipulates shares of a Beaver value. In this embodiment, the processor 108 in each of the nodes 104A and 104B uses the f value from the reshare operation to generate a new ciphertext $ct_c' = \text{Enc}_{pk}(c+f) \boxplus ct_{f1} \boxplus ct_{f2}$ for the $f_1$ value in the node 104A and the $f_2$ value in the node 104B with a new signature: $ct_{\lambda c} = ct_\lambda \boxtimes ct_c'$. The nodes 104A and 104B then reshare the new value $ct_{\lambda c}$: Reshare ($ct_{\lambda c}$, $P_1$, $P_2$) so that each node holds a share of c: $[c_i] = (c_i, \gamma_i(c))$.

The Beaver triple generation and exchange process of the process 200 is substantially similar to that of the SPDZ protocol with the exception that the SPDZ protocol requires the generation of N Beaver triples to perform a multiparty inner product computation for N-element vectors while the process 200 only requires the generation of N/2 Beaver triples. As described above, the generation of each Beaver triple requires four reshare operations (one for each of a and b and two for c) along with several encryption operations that are computationally expensive in comparison to standard multiplication/addition operations, and the process 200 reduces the required number of Beaver triples by a factor of two compared to prior-art SPDZ implementations. The offline phase of the process 200 can be completed in advance of the commencement of the remainder of the process 200 to perform multiparty inner produce computations and each nodes stores the shares of the Beaver triples in the value share data 132. While the process 200 and the offline phase of block 204 are described in conjunction with two nodes 104A and 104B for illustrative purposes, the same process is applicable to systems that use groups of three or more nodes.

The process 200 continues in an online phase as each node generates a first plurality of random values corresponding to each element in the plaintext vector data and generates an encrypted signature for each value (block 208). The processor 108 in each of the nodes 104A and 104B generates a first plurality of random values $x_{i2} \in F_p$ with a uniform random distribution where each value $x_{i2}$ corresponds to the element $x_i$ in the plaintext vector x where the 2 subscript indicating the random value corresponds to the node 104B. Similarly, the processor 108 in node 104B generates random values $w_{i2} \in F_p$ with the uniform random distribution that correspond to each element $w_i$ in the plaintext vector w where the 2 subscript indicates the random values correspond to other the node 104A. As described above, the random values $x_{i2}$ and $w_{i2}$ form the shares that are distributed in the share distribution process. The processor 108 in each of the nodes 104A and 104B encrypts and signs each of the plaintext values: $ct_{\lambda_{xi}} = \text{Enc}_{pk}(x_i) \boxtimes ct_\lambda$, and $ct_{\lambda_{wi}} = \text{Enc}_{pk}(w_i) \boxtimes ct_\lambda$, to generate two pluralities of encrypted signatures $ct_{\lambda_{xi}}$ and $ct_{\lambda_{wi}}$ for the elements in the vectors x and w, respectively.

The process 200 continues as each node generates pair products for each pair of elements in a single plaintext vector, generates second random values corresponding to the pair products, and generates an encrypted signature for each pair product (block 212). Each pair product is the result of a direct multiplication (not multiparty multiplication) by the processor 108 of two elements in the plaintext vector data 128 in the memory of each of the nodes 104A and 104B. For example, each pair product for the vector x in the node 104A is: $\overline{x}_j = x_{(2j-1)} \cdot x_{2j}$ for each j in a range of [1, k] where k represents the number of pairs in the vector. The controller 108 in the node 104B also generates pair products $\overline{w}_j = w_{(2j-1)} \cdot w_{2j}$ for each j in a range of [1, k]. For example, in a four element vector there are k=2 pairs at element indices (1, 2) and (3, 4), in a six element vector there are k=3 pairs at element indices (1, 2), (3, 4), (5, 6), etc, where the controller 108 multiplies the two elements in each pair to produce each pair product. The pairs are described as adjacent elements in the embodiments described herein for explanatory purposes, but any two elements from a single vector, including non-adjacent elements, can be used in a pair as long as each element is used in exactly one pair, and that all nodes in the process 200 select the pairs from the two vectors in a consistent manner so that the correct elements from two vectors are multiplied together during the multiparty inner product computation process. The overline notation indicates a pair product value or another value that is related to a pair product.

The processor 108 in each of the nodes 104A and 104B encrypts each of the pair product values and signs the pair product value to generate an encrypted signature for the ciphertext of each pair product: $ct_{\lambda_{\overline{x}j}} = \text{Enc}_{pk}(\overline{x}_j) \boxtimes ct_\lambda$, and $ct_{\lambda_{\overline{w}j}} = \text{Enc}_{pk}(\overline{\omega}_j) \boxtimes ct_\lambda$. The processor 108 in each of the nodes 104A and 104B also generates a second plurality of random values $\overline{x}_{j2} \in F_p$ with a uniform random distribution where each value $\overline{x}_{j2}$ corresponds to the pair product and the processor 108 in node 104B generates random values $\overline{x}_{j2} \in F_p$ that correspond to each pair product Thus, the second plurality of random values $\overline{x}_{j2}$ or $\overline{w}_{j2}$ includes k random values corresponding to the number of element pairs in each vector while the first plurality of random values $x_{i2}$ or $w_{i2}$ that are described above have N random values (where N=2k) corresponding to each individual element in the vectors x and w. The second plurality of random values $\overline{x}_{j2}$ or $\overline{w}_{j2}$ form the shares of the pair products that are distributed to the other nodes (e.g. from node 104A to node 104B or from node 104B to node 104A) to distribute shares of the pair products.

The process 200 continues as the processor 108 and the network interface device 112 in each of the nodes 104A and 104B performs share distribution operations to distribute shares of all the individual vector element values and pair product values and performs resharing operations to produce shares of the encrypted signatures of the individual vector element values and pair product values (block 216). In the node 104A, the processor 108 uses the network interface device 112 to transmit the first plurality of random values corresponding to individual vector elements ($x_{i2}$ for node 104A) and the second plurality of random values corresponding to the pair products ($\overline{x}_{j2}$ for node 104A) to node 104B, which receives the random values and uses the random values as shares of the elements in the first vector and shares of the pair products for the first vector. As described above, these random values form the shares of the vector elements and pair products for the node 104B while the processor 108 in the node 104A uses the differences between the actual values and the random values as the shares (e.g. $x_{i1} = x_i - x_{i2}$ and $\overline{x}_{j1} = \overline{x}_j - \overline{x}_{j2}$). Similarly, the processor 108 in the node 104B uses a network device to transmit the first plurality of random values for the elements in the vector w ($w_{i2}$ for node 104B) and the second plurality of values for the pair products ($\overline{w}_{i2}$ for node 104B) to the first node 104A, which receives the random values and uses the random values as shares of the elements in the second vector and shares of the pair products for the second vector. The processor 108 in the node 104B also generates shares of the vector elements and pair products based on the difference values: $w_{i1}=w_i-w_{i2}$ and $\overline{w}_{j1}=\overline{w}_j-\overline{w}_{j2}$. The processor 108 in each of the nodes 104A and 104B also performs the reshare operation to reshare encrypted signatures for the individual vector element values ((Reshare $$(ct_{\lambda_{x_i}}, P_1, P_2),$$

Reshare $$(ct_{\lambda_{w_j}}, P_1, P_2))$$

and shares of the encrypted signatures for the pair product values, (Reshare $$(ct_{\lambda_{\overline{x}_j}}, P_1, P_2),$$

Reshare $$(ct_{\lambda_{\overline{w}_j}}, P_1, P_2)).$$

The processing of blocks 208-216 is described in a particular order for illustrative purposes, but the specific order of generation of the first and second pluralities of random values, the encryption of the vector elements and the pair products, and the share distribution and resharing operations can occur in different orders than what is described above.

The process 200 continues as the controllers 108 in both of the nodes 104A and 104B perform multiparty additions of alternating shares corresponding to elements in each element pair from the two vectors to generate first and second sum shares for each pair of elements in the two vectors (block 220). In more detail, the two nodes 104A and 104B use the alternating shares of the individual elements $[x_i]$ and $[w_i]$ to two perform multiparty additions for each pair of elements in the two vectors to add the first share from vector x to the second share from vector w in each pair, and to add the first share from vector w to the second share from vector x in each pair. Given $([w_1]+[x_2])([w_2]+[x_1])$, the first sum share in each pair of element corresponds to the alternating shares of elements $([w_{(2j-1)}]+[x_{(2j)}])$ for each pair of elements j in a range of [1, k] in vectors that have a total of k pairs of elements. An example of the first plurality of sum shares for alternating shares is $([w_1]+[x_2])$, $([w_3]+[x_4])$, $([w_5]+[x_6])$, for multiparty additions of each pair of elements for vectors with k=3 pairs of elements. The second plurality of sum shares correspond to the multiparty addition sum of alternating shares of the elements in each pair described by the term $([w_{(2j)}]+[x_{(2j-1)}])$, with multiparty additions for $([w_2]+[x_1])$, $([w_4]+[x_3])$, $([w_6]+[x_5])$, of the alternating shares for each pair of elements for vectors with k=3 pairs of elements.

The process 200 continues as the controllers 108 in both of the nodes 104A and 104B perform N/2 multiparty multiplications of first and second sum shares from each pair of elements in the vectors to generate inner product pair shares (block 224). The "inner product pair shares" refer to the shares of products from a multiparty multiplication of the first and second sum shares from each pair of elements. For example, the inner product pair share ([d]) for the sum shares of the first pair of elements in the two vectors is: $[d_1]$=Mult $((([w_1])+[x_2]), ([w_2])+[x_1]))$ where the nodes 104A and 104B have already computed the sum shares using the multiparty additions that are described above in the processing of block 220. The two nodes generate $[d_j]$ inner product pair shares corresponding to each pair j in [1, k] for k total element pairs the two vectors ($[d_j]$=Mult $((([w_{(2j-1)}])+[x_{2j}]), ([w_{2j}])+[x_{(2j-1)}]))$. As described above, each multiparty multiplication consumes one of the Beaver triples that have been shared between the nodes 104A and 104B in the offline phase.

The process 200 continues as the controllers 108 in both of the nodes 104A and 104B perform a multiparty addition that adds all of the inner product pair shares $[d_j]$ together and subtracts all of the pair product values $[\overline{x}_j]$ and $[\overline{w}_j]$ from the sum of the inner product pair shares to generate shares of the final inner product value (block 228). A share of the final inner product value is the output of the following multiparty addition: Add($[d_1]$, . . . , $[d_k]$, $-[\overline{x}_k]$, . . . , $-[\overline{x}_k]$, $-[w_1]$, . . . , $-[\overline{w}_k]$). The subtraction of all the pair product share values includes performing the multiparty addition with negated pair product shares from both the first and second vectors to produce the correct inner product value since, as described above, the standard and multiparty multiplication operation of the sum of two alternating shares of elements including a share of one element from each of the first and second vectors in a pair: $([w_1]+[x_2])([w_2]+[x_1])=[w_1w_2]+[w_1x_1]+[x_2w_2]+[x_2x_1]$ produces the unwanted terms $[w_1w_2]$ and $[x_2x_1]$, which are the pair product terms for each pair of shares, but are not part of an inner product computation. Thus, subtracting the pair product share values for each pair of elements in the two vectors produces the correct inner product result.

After performing the process 200, each of the nodes 104A and 104B has a share of the inner product value, which the memory 120 in each of the nodes 104A and 104B stores as a share of inner product result 140. The share of inner product result 140 does not reveal the full inner product result to either node 104A and 104B, which preserves privacy of the plaintext data 128, especially in instances when one of the two vectors x and w is used for a larger number of computations without changing any values in the vector. For example, the weight vector w in a trained neural network often remains constant for a large number of computations, and if another party could gain access to a large number of inputs x and observe the corresponding inner product outputs, then that party could deduce the individual elements of the weight vector w given a reasonably large number of observations. Thus, the process 200 prevents the nodes 104A and 104B from having full access to the final inner product value to protect the privacy of the vectors x and w. The shares of the inner product value can be transmitted to another computing device that is not part of the group that adds the shares together to obtain the actual result of the inner product computation or the shares of the inner product computation can be used as an input to additional multiparty operations by the nodes 104A and 104B.

In the example described above, the process 200 performs multiparty inner product computation for two vectors that have an even number of elements for illustrative purposes. The process 200 can be modified to accommodate vectors that have an odd number of elements as well. For example, two or more nodes can perform the process 200 to generate the inner product of two vectors that have a total of nine (9) elements by performing the process 200 to generate shares of the inner product value 140 for the first eight elements in both vectors. Then, the nodes can perform a conventional SPDZ process to multiply the final elements together with a single operation, and perform an additional multiparty addition to add the product of the final pair of elements to the share of the inner product from the previous eight elements to generate the final inner product. This process still produces an improvement in performance since the multiparty inner product process only requires five multiplications $$\left(\left\lfloor\frac{N}{2}\right\rfloor+1\right)$$

multiparty multiplications where N=9) instead of the standard nine multiparty multiplications.

The system 100 and the process 200 described herein provide improvements to the operation of computerized systems that implement multiparty inner product computations while preserving privacy and improving the computational efficiency of the multiparty inner product computation. As described above, the process 200 requires only half of the multiparty multiplications to compute the inner product compared to a prior art SPZ inner product computation, and therefore only requires the generation of half of the Beaver triple shares during the offline phase of the process 200 compared to the prior art SPDZ inner product computation. The following table illustrates the total number of operations that are performed in the prior art SPDZ inner product computation compared to the process 200:

| For vectors of length N | SPDZ (prior art) | Process 200 |
| --- | --- | --- |
| # of encrypted signature values reshared in online phase | 2N | 3N |
| # of share distribution operations | 2N | 3N |
| # of multiparty multiplications | N | N/2 |
| # of Beaver triples to be generated and consumed | N | N/2 |
| # of multiparty additions | 1 | N/2 + 1 |

The process 200 requires a larger number of encrypted signature values to be shared using the resharing operation and requires more multiparty additions to perform the multiparty inner product computation process compared to a prior art SPDZ inner product computation. However, as described above the multiparty addition is both computationally efficient and requires no communication between parties, so the extra multiparty additions have a much smaller negative impact on performance than positive impacts on performance that arise from the reduction in both the number of Beaver triples that must be calculated and the number of multiparty multiplications, both of which require communication between the participating nodes. Furthermore, since each Beaver triple calculation operation requires four reshare operations, even though the process 200 needs to perform 3N reshares in the online phase instead of 2N reshares of the prior art SPDZ process, the total number of reshare operations in the process 200 is lower than a prior art SPDZ inner product computation process (3N reshares+ 4*N/2 reshares <2N reshares+4*N reshares→5N reshares <6N reshares). The number of share distribution operations in the process 200 is also higher than in a traditional SPDZ operation, but as described above each share distribution operation only requires one node to generate and transmit one or more random values combined with an non-multiparty subtraction operation, which is a much simpler computational process than the multiparty multiplication and computation of Beaver triples, so the overhead from additional share distribution operations is smaller than the other gains in efficiency that are provided by the process 200.

While not described in greater detail herein, the encrypted signature values generated during the process 200 enable the nodes 104A and 104B to verify that shared values have not been altered during the process 200, which would produce an incorrect result. A simplified embodiment of the process 200 assumes that the nodes 104A and 104B do not alter shared data, which is referred to as a "semi-honest" system since the nodes 104A and 104B are assumed to attempt to compromise the privacy of private data but are assumed to not alter any shared data received during the process 200. In the semi-honest embodiment, the encrypted signature values may be omitted, and these values do not need to calculated or reshared between the nodes 104A and 104B during the process 200, which reduces the computational complexity of the process 200 in situations where the nodes are trusted to not alter the shared data.

While the embodiment of the process 200 described above is performed using two nodes 104A and 104B, the process 200 can be performed by larger groups of three or more nodes. In particular, the process 200 can incorporate a third node that stores a portion of the vector x held in the memory 120 of the node 104A or the vector w that is stored in the memory 120 of the node 104B to provide additional privacy by distributing the plaintext vector data to a larger number of nodes that maintain the privacy of the stored data. Even larger numbers of nodes can perform the process 200 and further divide the storage of the vector data for either or both of the vectors x and w. In general, each node stores the plaintext data for at least two values (at least one pair of values) from one of the two vectors x and w that are provided as inputs to the multipart inner product computation process. As described above, during the resharing process all of the nodes that participate in the process 200 receive shares of each element and each pair product from both of the vectors x and w, even if the node only stores the plaintext value for a smaller number of elements from one vector. Each node in the larger group also participates in the multiparty computation of the process 200 as described above.

It will be appreciated that variants of the above-described and other features and functions, or alternatives thereof, may be desirably combined into many other different systems, applications, or methods. Various presently unforeseen or unanticipated alternatives, modifications, variations or improvements may be subsequently made by those skilled in the art that are also intended to be encompassed herein in the following claims.

What is claimed:

1. A method for secure multiparty computation of an inner product comprising:
performing, with a processor in a first node, a plurality of multiparty additions, each multiparty addition generating one of a first sum share and a second sum share between alternating shares of elements from corresponding pairs of elements in a first vector and a second vector;
performing, with the processor and a network interface device in the first node, a plurality of multiparty multiplications with at least one other node, each multiparty multiplication generating an inner product pair share corresponding to a product of the first sum share and the second sum share corresponding to each pair of elements in the first vector and the second vector; and performing, with the processor in the first node, another multiparty addition of each inner product pair share from the plurality of multiparty multiplications with a first plurality of negated shares of pair products corresponding to pairs of elements in the first vector and a second plurality of negated shares of pair products corresponding to pairs of elements in the second vector to generate a share of an inner product of the first vector and the second vector.

2. The method of claim 1, wherein the first vector and the second vector each have a first number of elements and a number of the multiparty multiplications performed by the processor and the network interface in the first node is one half of the first number.

3. The method of claim 1 further comprising:
generating, with the processor and the network interface device in the first node, a plurality of Beaver triples prior to performing the plurality of multiparty multiplications, each Beaver triple including shares of three values that are reshared between the first node and the at least one other node, each multiparty multiplication in the plurality of multiparty multiplications consuming the shares of the three values of one Beaver triple in the plurality of Beaver triples.

4. The method of claim 1 further comprising:
generating, with a processor in the first node, a first plurality of pair products by multiplication of pairs of elements in the first vector stored in a memory in the first node;
encrypting, with the processor in the first node, each pair product in the first plurality of pair products using a public key to generate a first plurality of encrypted pair products;
generating, with the processor in the first node, a first plurality of encrypted signatures for the first plurality of encrypted pair products using an encrypted message authentication code (MAC) key; and
performing, with the processor and the network interface device in the first node, a plurality of resharing operations to distribute shares of each encrypted signature between the first node and the at least one other node.

5. The method of claim 1, wherein the at least one other node includes a plurality of other nodes.

6. A method for secure multiparty computation of an inner product comprising:
performing, with a processor and a network interface device in a first node, a first plurality of share distribution operations to distribute a first plurality of shares corresponding to a plurality of elements in a first vector stored in a memory of the first node between the first node and at least one other node;
generating, with a processor in the first node, at least one pair product based on a multiplication of at least one pair of elements in the first plurality of elements in the first vector;
performing, with the processor and the network interface device in the first node, at least one share distribution operation to distribute shares of the at least one first pair product between the first node and the at least one other node;
receiving, with the processor and the network interface device in the first node, a second plurality of shares from the at least one other node, the second plurality of shares corresponding to a plurality of elements in a second vector;

receiving, with the processor and the network interface device in the first node, at least one second pair product share from the at least one other node, the at least one second pair product share corresponding to at least one pair product of two elements in the second vector;
performing, with the processor in the first node, a plurality of multiparty additions, each multiparty addition generating one of a first sum share and a second sum share between alternating shares of elements from corresponding pairs of elements in a first vector and a second vector;
performing, with the processor and the network interface device in the first node, at least one multiparty multiplication with the at least one other node, each multiparty multiplication generating an inner product pair share corresponding to a product of the first sum share and the second sum share corresponding to each pair of elements in the first vector and the second vector; and
performing, with the processor in the first node, another multiparty addition of each inner product pair share from the at least one multiparty multiplication with a negation of the at least one first pair product share and a negation of the at least one second pair product share to generate a share of an inner product of the first vector and the second vector.

7. The method of claim 6, wherein the first vector and the second vector each have a first number of elements and a number of the multiparty multiplications performed by the processor and the network interface in the first node is one half of the first number.

8. The method of claim 6 further comprising:
generating, with the processor and the network interface device in the first node, at least one Beaver triple prior to performing the at least one multiparty multiplication, the at least one Beaver triple including shares of three values that are reshared between the first node and the at least one other node, each multiparty multiplication in the at least one multiparty multiplication consuming the shares of the three values of one Beaver triple.

9. The method of claim 6 further comprising:
generating, with a processor in the first node, a first plurality of pair products by multiplication of pairs of elements in the first vector stored in a memory in the first node;
encrypting, with the processor in the first node, each pair product in the first plurality of pair products using a public key to generate a first plurality of encrypted pair products;
generating, with the processor in the first node, a first plurality of encrypted signatures for the first plurality of encrypted pair products using an encrypted message authentication code (MAC) key; and
performing, with the processor and the network interface device in the first node, a plurality of resharing operations to distribute shares of each encrypted signature between the first node and the at least one other node.

10. The method of claim 6, wherein the at least one other node includes a plurality of other nodes.

11. A node configured to perform secure multiparty computation of an inner product comprising:
a network interface device configured to communicate with at least one other node;
a memory configured to store:
a first plurality of shares corresponding to a plurality of elements in a first vector;
a second plurality of shares corresponding to a plurality of elements in a second vector;

a first plurality of negated shares of pair products corresponding to pairs of elements in the first vector; and a second plurality of negated shares of pair products corresponding to pairs of elements in the second vector; and a processor operatively connected to the network interface device and the memory, the processor being configured to:

perform a plurality of multiparty additions, each multiparty addition generating one of a first sum share and a second sum share between two alternating shares of elements from the first vector and the second vector, the two alternating shares including one share in the first plurality of shares and another share in the second plurality of shares;

perform a plurality of multiparty multiplications with at least one other node using the network interface device, each multiparty multiplication generating an inner product pair share corresponding to a product of the first sum share and the second sum share corresponding to each pair of elements in the first vector and the second vector; and perform another multiparty addition of each inner product pair share from the plurality of multiparty multiplications with the first plurality of negated shares of pair products stored in the memory and the second plurality of negated shares of pair products stored in the memory to generate a share of an inner product of the first vector and the second vector.

12. The node of claim 11, wherein the first vector and the second vector each have a first number of elements and a number of the multiparty multiplications performed by the processor and the network interface in the node is one half of the first number.

13. The node of claim 11, the processor being further configured to:

generate a plurality of Beaver triples prior to performing the plurality of multiparty multiplications, each Beaver triple including shares of three values that are reshared between the node and the at least one other node using the network interface device, each multiparty multiplication in the plurality of multiparty multiplications consuming the shares of the three values of one Beaver triple in the plurality of Beaver triples.

14. The node of claim 11, the processor being further configured to:

generate a first plurality of pair products by multiplication of pairs of elements in the first vector, the first vector being stored in the memory;

encrypt each pair product in the first plurality of pair products using a public key to generate a first plurality of encrypted pair products;

generate a first plurality of encrypted signatures for the first plurality of encrypted pair products using an encrypted message authentication code (MAC) key; and perform a plurality of resharing operations to distribute shares of each encrypted signature between the first node and the at least one other node using the network interface device.

15. The node of claim 11, wherein the at least one other node includes a plurality of other nodes.

* * * * *